US008813095B2

(12) United States Patent
Anderson et al.

(10) Patent No.: US 8,813,095 B2
(45) Date of Patent: *Aug. 19, 2014

(54) AUDIO FEEDBACK FOR COMMAND LINE INTERFACE COMMANDS

(75) Inventors: Dale H. Anderson, Tucson, AZ (US);
Paul A. Jennas, II, Tucson, AZ (US);
Jason L. Peipelman, Vail, AZ (US);
Matthew J. Ward, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 397 days.

This patent is subject to a terminal disclaimer.

(21) Appl. No.: 13/232,864

(22) Filed: Sep. 14, 2011

(65) Prior Publication Data

US 2013/0067481 A1    Mar. 14, 2013

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC .......................................................... 719/318

(58) Field of Classification Search
None
See application file for complete search history.

(56) References Cited

U.S. PATENT DOCUMENTS

| 5,542,088 | A | 7/1996 | Jennings, Jr. et al. |
| 6,934,955 | B2 * | 8/2005 | Nickum ........................ 719/318 |
| 7,697,926 | B2 * | 4/2010 | Brown et al. .................. 455/419 |
| 8,265,938 | B1 * | 9/2012 | Verna et al. ................... 704/274 |
| 2008/0005286 | A1 * | 1/2008 | Short et al. .................... 709/220 |
| 2009/0210882 | A1 * | 8/2009 | Srivastava et al. ............ 718/107 |

* cited by examiner

*Primary Examiner* — Emerson Puente
*Assistant Examiner* — Kimbleann Verdi
(74) *Attorney, Agent, or Firm* — Griffiths & Seaton PLLC

(57) ABSTRACT

A system for providing audio feedback for command line interface (CLI) commands in a computing environment. Auditory notifications are generated for indicating a completion of CLI commands. The auditory notifications are configurable by user preferences.

12 Claims, 6 Drawing Sheets

AUDIO FEEDBACK FOR COMMAND LINE INTERFACE COMMANDS

BACKGROUND OF THE INVENTION

1. Field of the Invention

The present invention relates in general to computers, and more particularly to audio feedback for command line interface (CLI) commands in a computing environment.

2. Description of the Related Art

In today's society, computer systems are commonplace. Computer systems may be found in the workplace, at home, or at school. Computers typically connect to communication networks, such as the Internet, so as to enable information (e.g., data or files) to be passed from one computer to another computer. Computer systems may include data storage systems, or disk storage systems, to process and store data. A storage system may include one or more disk drives.

Also within a computing environment, command line interface (CLI) applications may be used to provide an interface to a computational platform or other application. CLI applications may be found in a variety of computing environment settings. For example, in storage controllers, command line interface (CLI) commands are used to configure hardware resources and to utilize existing resources for several different applications.

The configuration of hardware resources involves the creation and deletion of resources such as arrays, volumes, volume groups, host connections, and the like. Once the hardware resources are configured, the configured resources may be used for such applications as Copy Services applications (e.g., FLASHCOPY™, Metro Mirror Global Mirror).

SUMMARY OF THE DESCRIBED EMBODIMENTS

In today's configuration Command Line Interface (CLI) tools for many storage and networking products, a need exists to provide better positive and negative feedback for commands. This is especially true in situations where the user initiates commands that return large amounts of data that either result in a large number of independent return codes, commands that execute a script in which the user has encapsulated a large number of commands, or running commands that generate asynchronous processes that have very long run times. In such cases, an audio feedback notification would increase the efficiency and productivity when the CLI configuration commands or sets of commands are completed by eliminating the need for constant visual focus of the user. Such functionality would allow the user to perform other tasks simultaneously, such as running commands via another window and running commands in the same window with a set of asynchronous commands running in the background.

Accordingly, and in view of the foregoing, various embodiments for audio feedback for command line interface (CLI) commands in a computing environment are provided. In one embodiment, by way of example only, auditory notifications are generated for indicating a completion of CLI commands. The auditory notifications are configurable by user preferences.

In addition to the foregoing embodiment, other exemplary embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
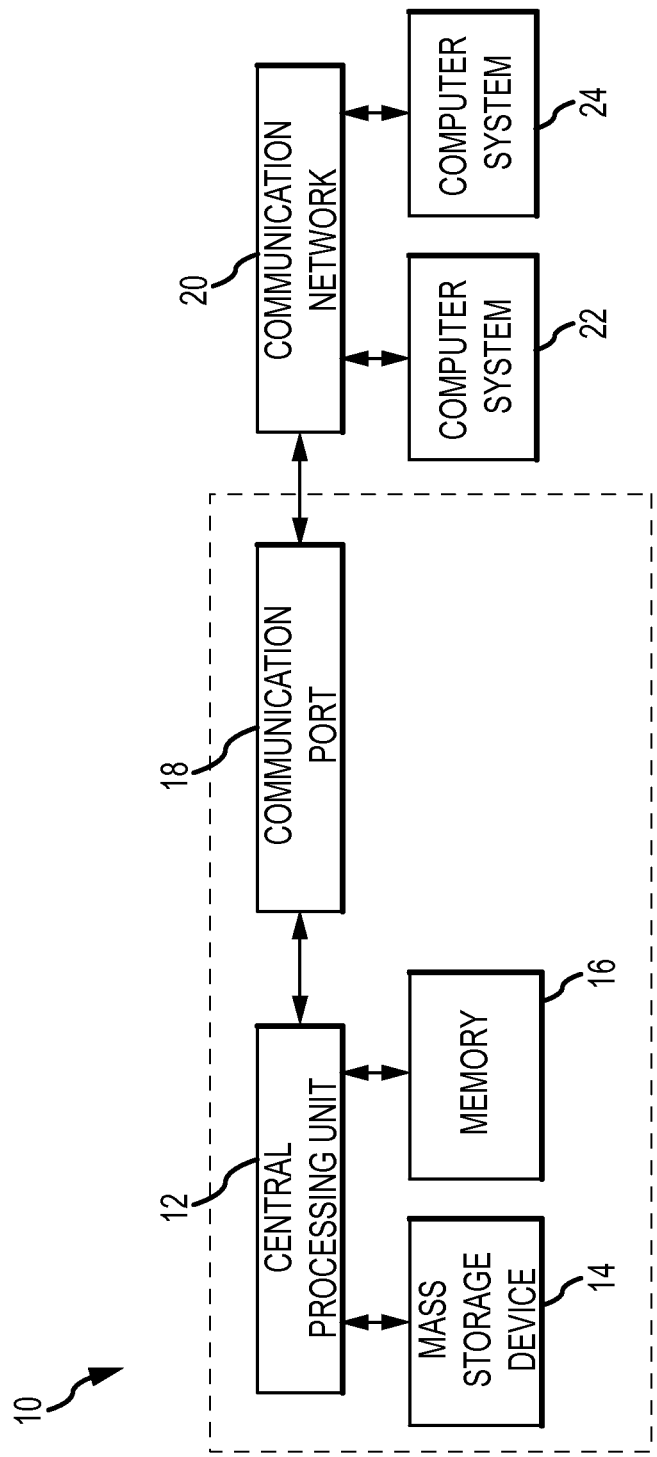
FIG. 1 illustrates a computing storage environment having an exemplary storage device in which aspects of the present invention may be realized.

As previously mentioned, a need exists to provide better positive and negative feedback configuration Command Line Interface (CLI) tools for many storage and networking products, commands. This is especially true in situations where the user initiates commands that return large amounts of data that either results in a large number of independent return codes, commands that execute a script in which the user has encapsulated a large number of commands, and/or running commands that generate asynchronous processes that have very long run times. In such cases, an audio feedback notification system would increase the efficiency and productivity when the CLI commands or sets of commands/tasks complete by eliminating the need for constant visual focus of the user. Such functionality would allow the user to perform other tasks simultaneously such as running commands via another window and running commands in the same window with a set of asynchronous commands running in the background.

However, the current state of the art is limited to one of two options. The first is outputting text on a computer monitor to notify the user of command completion where the CLI is running. Such an option decreases efficiency when either visual focus is shifted away from the window or in the case of asynchronous commands running in the background, the notification gets mixed in amongst output from the result of other commands that the user is executing simultaneously. Second, in most CLI interfaces, the interface allows a command to issue which causes an asynchronous process to be initiated to have an additional parameter which converts the command to a synchronous call wherein the command doesn't return until the asynchronous process has completed. However, a need exists for an audio feedback notification solution by taking advantage of this existing function by generating a notification as a new option that is intuitive for users who know the current interface. Moreover, a need exists to satisfy the requirement of CLI installations, which are only usable from the operating system command line. In other words, the asynchronous task notification must not require another window or other frame/view to notify the user of its completion.

In order to address the inefficiencies and performance issues previously described, the illustrated embodiments provide mechanisms for audio feedback for a storage command line interface (CLI) in a computing environment. In one embodiment, by way of example only, auditory notifications are generated for indicating a completion of CLI commands. The auditory notifications are configurable by user preferences.

In one embodiment, an audio feedback notification system generates audio notifications to the user indicating that a task of the CLI configuration command is complete which uniquely identify the status of the command completion and optionally a notification when all tasks in a set complete. For asynchronous commands, the mechanisms register a listener or polling thread that fires an event to a notification system when an asynchronous task completes. It should be noted that although the mechanisms and/or drawings may refer specifically to storage CLI configuration commands, the mechanisms and drawings for the CLI are not meant to be limited only to storage or configuration. Rather, the mechanisms and/or drawings of the present invention may also apply to CLI in other areas such as a CLI for a router and/or to query commands.

FIG. 1 illustrates a computing storage environment having an exemplary storage device in which aspects of the present invention may be realized. Computer system 10 includes central processing unit (CPU) 12, which is connected to mass storage device(s) 14 and memory device 16. Mass storage devices may include hard disk drive (HDD) devices, which may be configured in a redundant array of independent disks (RAID). Memory device 16 may include such memory as electrically erasable programmable read only memory (EEPROM) or a host of related devices. Memory device 16 and mass storage device 14 are connected to CPU 12 via a signal-bearing medium. In addition, CPU 12 is connected through communication port 18 to a communication network 20, having an attached plurality of additional computer systems 22 and 24. The computer system 10 may include one or more processor devices (e.g., CPU 12) and additional memory devices 16 for each individual component of the computer system 10 to execute and perform each operation described herein to accomplish the purposes of the present invention.

It may be noted that the computer systems within computing environment 10 may be enterprise-class (or mainframe-type) systems. Within these systems, the mainframe may be referred to as the host or server 24, and may not include mass storage devices. Rather, the mass storage devices 50 may be managed by storage controllers 40, which are attached to the hosts using a storage network 30. Multiple hosts 24 and storage controllers 40 may be attached to a storage network 30, such that a host may access multiple storage controllers 40, and a storage controller 40 may be accessed by multiple hosts 24. The storage devices 50 may be integrated into the storage controller 40 and/or may be separate entities, again attached via some external point-to-point connection or storage network 30 (which may be attached and used to communicate from the storage controller 40 to the storage devices 50). There may be situations where the storage controller 40 and the storage devices 50 are physically integrated into the host and then there are communication networks 20 which interconnect multiple hosts.

Figure 2:
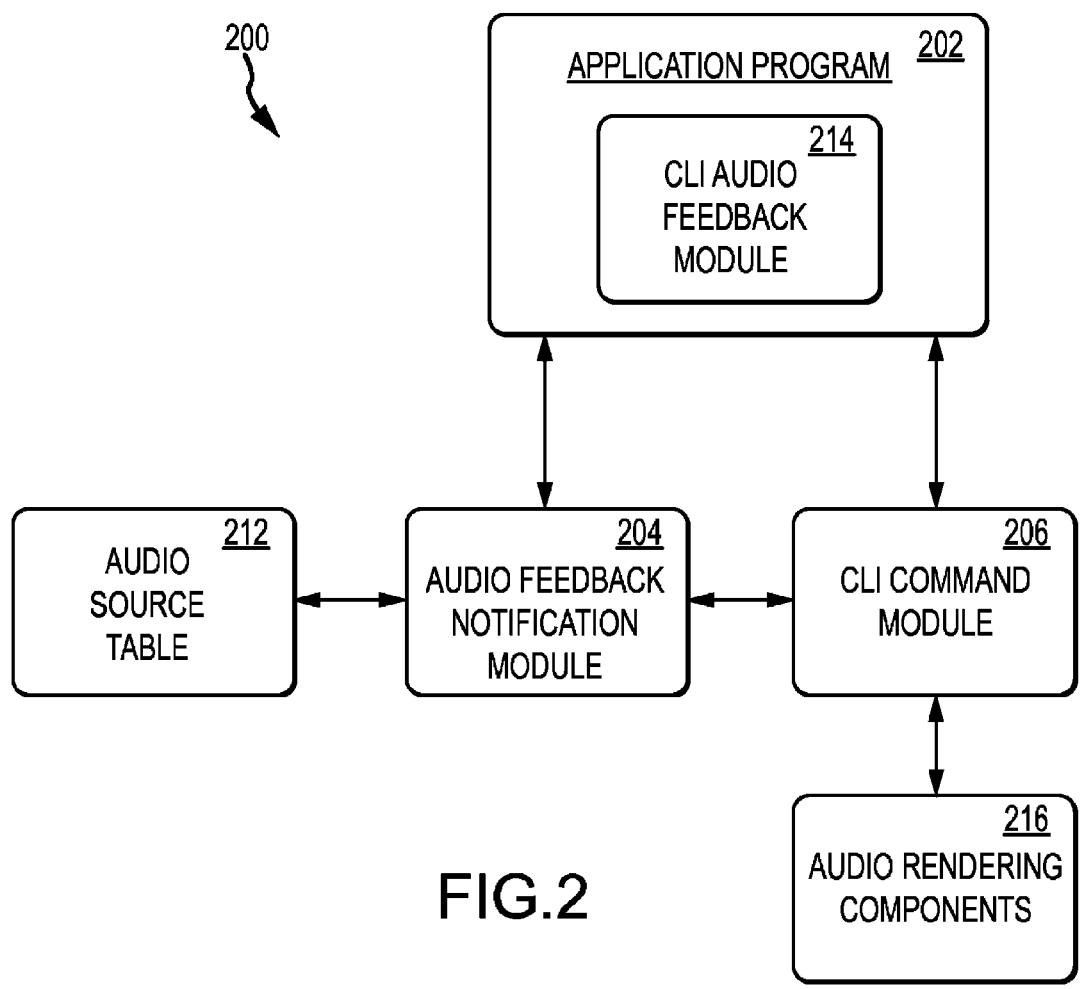
FIG. 2 is an exemplary block diagram showing a hardware structure for audio feedback notifications for command line interface (CLI) commands in a computing storage environment in which aspects of the present invention may be realized.

FIG. 2 is an exemplary block diagram 200 showing a hardware structure for generating audio feedback notifications for a storage command line interface (CLI) in a computing storage environment in which aspects of the present invention may be realized. The audio feedback notification system 200 generates audio events that are processed and rendered by separate audio processing components (not shown, but may be speakers, microphones, etc.) of a computing device or system. Audio generation system 200 includes an application program 202, an audio feedback notification module component 204, and a CLI Command module 206. Application program 202 is one of a variety of different types of applications for generating audio feedback notifications for storage command line interfaces.

The audio feedback notification module 204 and the CLI Command module 206 may be instantiated, or provided, as programming objects. The application program 202 interfaces with the audio feedback notification module 204, the CLI Command module 206, and the other components of the audio feedback notification system 200 and may be separated or be one complete module performing each function of the depicted components. Specifically, application program 202 interfaces with the audio feedback notification module 204 and with the CLI Command module 206. However, FIG. 2 is an exemplary block diagram not be construed as limiting in nature but additional structural configurations may be incorporated as required by the user for peek optimal performance. The various components described herein, such as the audio feedback notification module 204 and the CLI Command module 206, may be implemented using standard programming techniques, including the use of OLE (object linking and embedding) and COM (component object model) interfaces. COM objects are implemented in a system memory of a computing device, each object having one or more interfaces, and each interface having one or more methods. The interfaces and interface methods may be called by the application program 202 and by other objects. The interface methods of the objects are executed by a processing unit of the computing device. Familiarity with object-based programming, and with COM objects in particular, is assumed throughout this disclosure. However, those skilled in the art will recognize that the audio feedback notification systems and the various components described herein are not limited to a COM and/or OLE implementation, or to any other specific programming technique. In addition, each component may have their own processor device and memory components (as illustrated in FIG. 1) acting in conjunction with one another or the entire mechanisms may have one processor and memory component to complete the necessary operations.

The audio feedback notification system 200 includes an audio source table 212 (e.g., an audio look up table) that provide digital samples of audio data such as from a wave file (i.e., a .wav file), message-based data such as from a MIDI file or a pre-authored segment file, or an audio sample such as a Downloadable Sound (DLS). The table may include a variety of languages for speech notifications. Audio sources may be also stored as a resource component file of an application rather than in a separate file. For example, the CLI Audio Feedback Module 214 may be incorporated with application program 202.

Application Program 202 initiates that an audio source table 212 provides audio content input to the audio feedback notification module 204. The audio feedback notification module 204 receives the audio content from the audio source table 212 and produces audio notifications in response to the CLI Command module 206. The audio feedback notification system 200 receives the audio instructions and generates audio sound wave data by the audio rendering components 216. The audio feedback notification system 200 includes audio rendering components 216, which are hardware and/or software components, such as a speaker or soundcard, that renders audio from the audio sound wave data received from the CLI Command module 206 or other component as needed.

Figure 3:
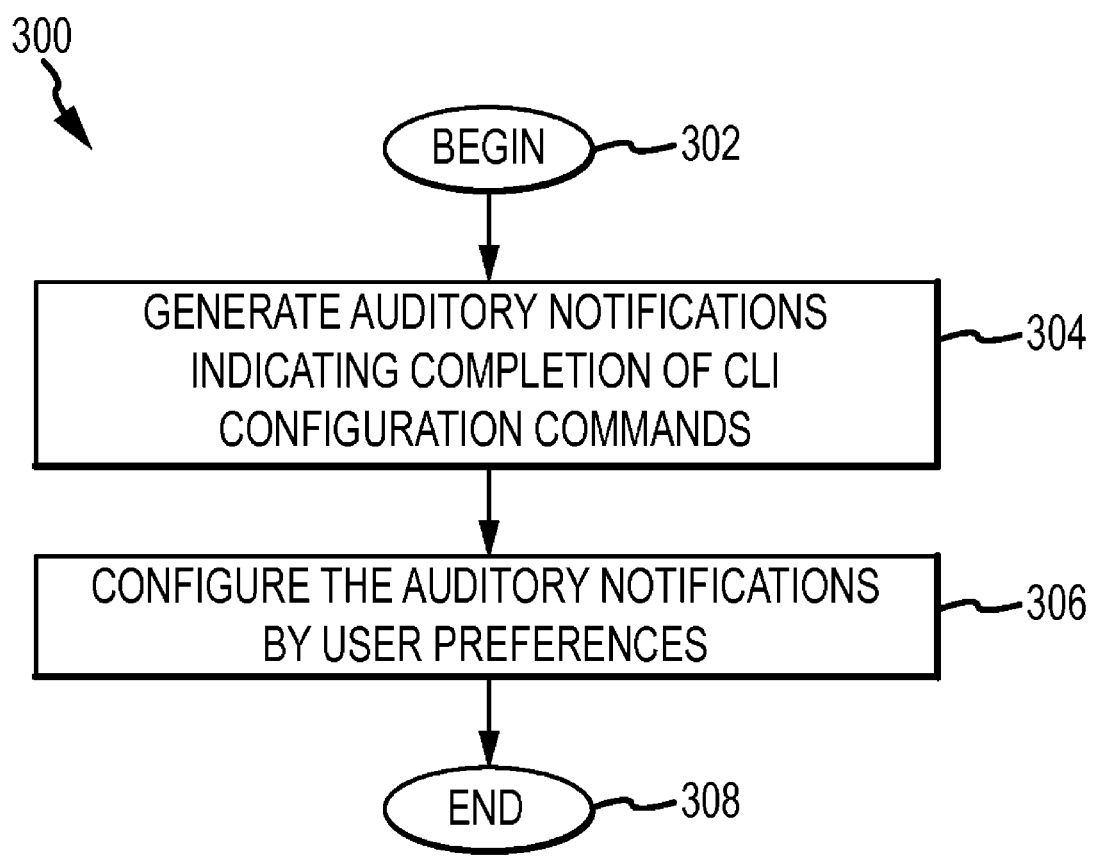
FIG. 3 is a flowchart illustrating an exemplary method for generating audio feedback for CLI commands.
Figure 6:
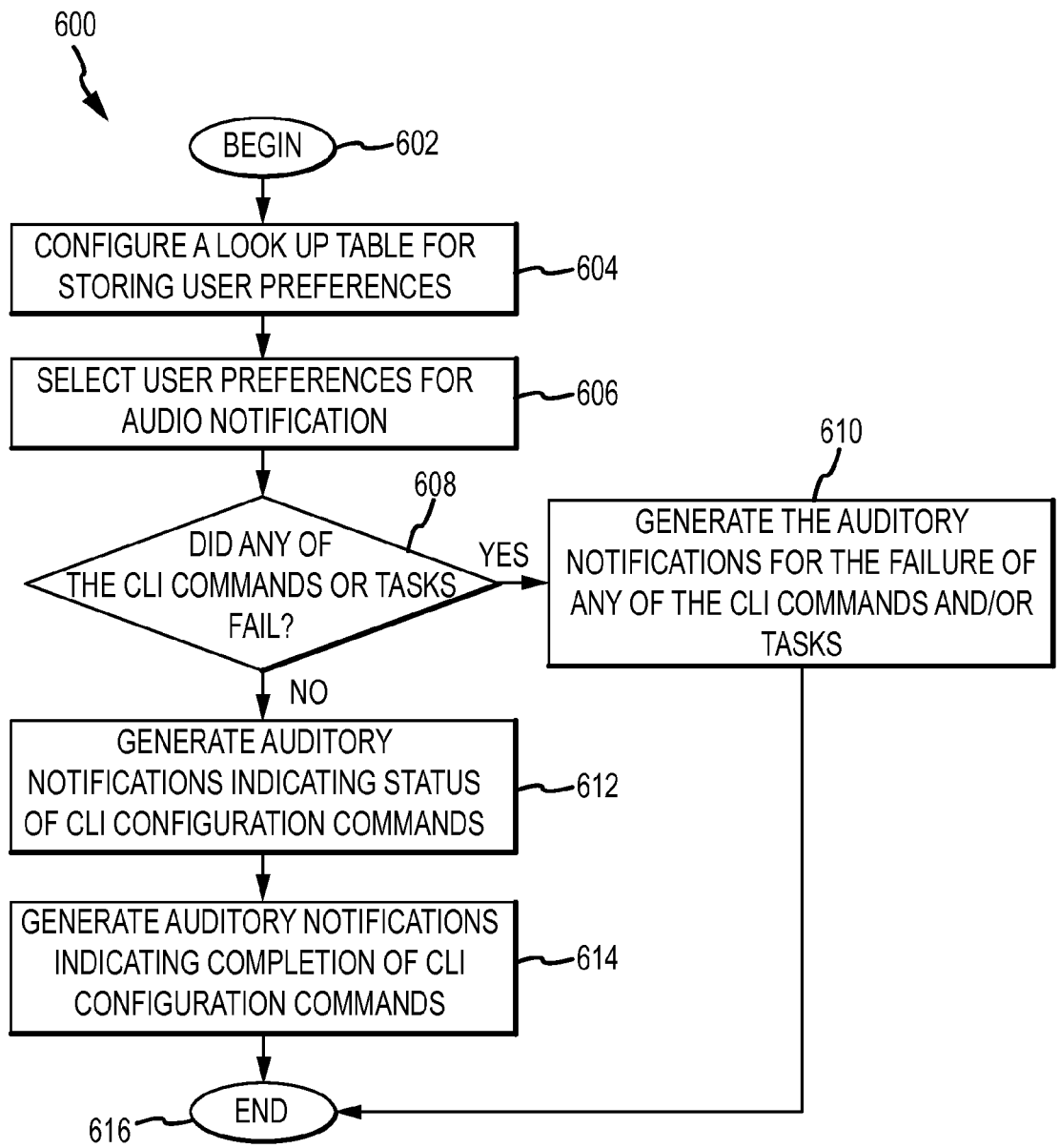
FIG. 6 is a flowchart illustrating an exemplary method for generating audio feedback for CLI commands with configurable user preferences.

FIG. 3 is a flowchart illustrating an exemplary method 300 for generating audio feedback for CLI commands according to the mechanisms of the illustrated embodiments. The method begins (step 302) by generating auditory notifications for indicating completion of CLI configuration commands (step 304). The audio feedback notifications are similar to a progress bar by indicating the current percentage of completion of the CLI configuration commands and/or tasks. Thus, the auditory notifications may be generated for indicating a status of each of the CLI configuration commands. The method 300 will configure the auditory notifications by user preferences, as depicted in FIG. 6, (step 306) and the method 300 ends (step 308).

As mentioned above, the mechanisms may refer specifically to storage CLI configuration commands, the mechanisms for the CLI are not meant to be limited only to storage or configuration. Rather, the mechanisms of the present invention may also apply to CLI in other areas such as a CLI for a router and/or to query commands.

In one embodiment, the mechanisms provide for generating audio feedback notifications for CLI configuration commands using the DS8000 Command Line Interface (DSCLI), as an example, and the user initiating a single command to create thousands of volumes as follows:

mkfbvol -dev IBM.2107-75FA120 -extpool P1 -name
       my_vol_#d -type ess -cap 8.6 -notifiy 0100-0FFF which results in output such as:

```
Date/Time: Sun Aug 11 02:23:49 PST 2004 IBM DS CLI Version: 5.0.0.0
DS:
IBM.2107-75FA120
FB Volume 0100 successfully created.
FB Volume 0101 successfully created.
FB Volume 0102 successfully created.
FB Volume 0103 successfully created.
FB Volume 0FFF successfully created.
```

The CLI configuration commands may result in the creation of 3840 volumes, which will take hours to complete. In the meantime, the user may desire to perform other tasks either creating or modifying other logical configuration objects on the same machine or a different machine in a separate window. However, the user may also desire to know when the volume creation command completes so that configuration of the volume groups may immediately begin thereafter. To do so, the user may optionally specify either via a configuration file or via the command-line, prior to executing the volume creation command, the type of audio notifications that should be generated. The following configuration file is illustrated as an example with the description provided below:

```
command_completion_notification:on
command_subtask_success_notification:off
```

```
command_subtask_error_notification:on
command_completion_success_sound:"bing.wav"
command_completion_error_sound:"buzz.wav"
command_subtask_success_sound:"tick.wav"
command_subtask_error_sound:"beep.wav"
```

The command_completion_notification indicates whether the user would like to receive audible feedback when a command has completed in which case the successful completion of the command would result in a user specified success sound (such as a "bing") whereas a command failure would result in a different sound (such as a "buzz", long system "bing" sound, or a double "bing" sound). In the case of the volume creation example above, the "bing" sound would be generated when all 3840 volumes were created successfully or the "buzz" sound if any of the volume creations failed. The command notifications may be turned "on" and/or "off" with the type of audio notification listed at the end such as ":beep.wav" selected as a "beep" notification.

The command_subtask_success_notification indicates whether the user would like to receive audible feedback when a sub-task of a command has completed successfully. In the case of volume creation example as previously described, a user specified sound (e.g., such as a "tick") would be generated for each successful volume that was created. With the given sample configuration file in the example above, the user has chosen to turn this notification off. The result is that the user will receive audible feedback only for a failed volume create and at the end when the entire command has completed. The command_subtask_error_notification indicates whether the user would like to receive audible feedback when a sub-task of a command has failed (e.g. such as a "beep").

As previously mentioned, in most CLI interfaces, the interface allows a command which causes an asynchronous process to be initiated to have an additional parameter which converts the command to a synchronous call, wherein the command doesn't return until the asynchronous process has completed. However, a need exists for a solution by taking advantage of this existing function by generating a notification as a new option that is intuitive for users who know the current interface. Thus, the mechanisms of the illustrated embodiments, by using the DSCLI as an example, allow the CLI configuration commands that support the existing wait option, as previously mentioned, to support a new option for notification (e.g. called "notify" and/or "notification" for the new option.)

The existing wait option allows a user to convert a command, which causes an asynchronous process to be initiated to a synchronous command that doesn't return until the asynchronous process has completed. This is very useful when writing scripts for the DSCLI, but not very useful in interactive mode (a mode in which the user issues commands one at a time manually). The new notification option would register a listener or polling thread that fires an event to a notification system when the asynchronous task completes. The notification system, in turn, generates an auditory notification to the user indicating that the task is complete, as illustrated below in FIG. 4.

Figure 4:
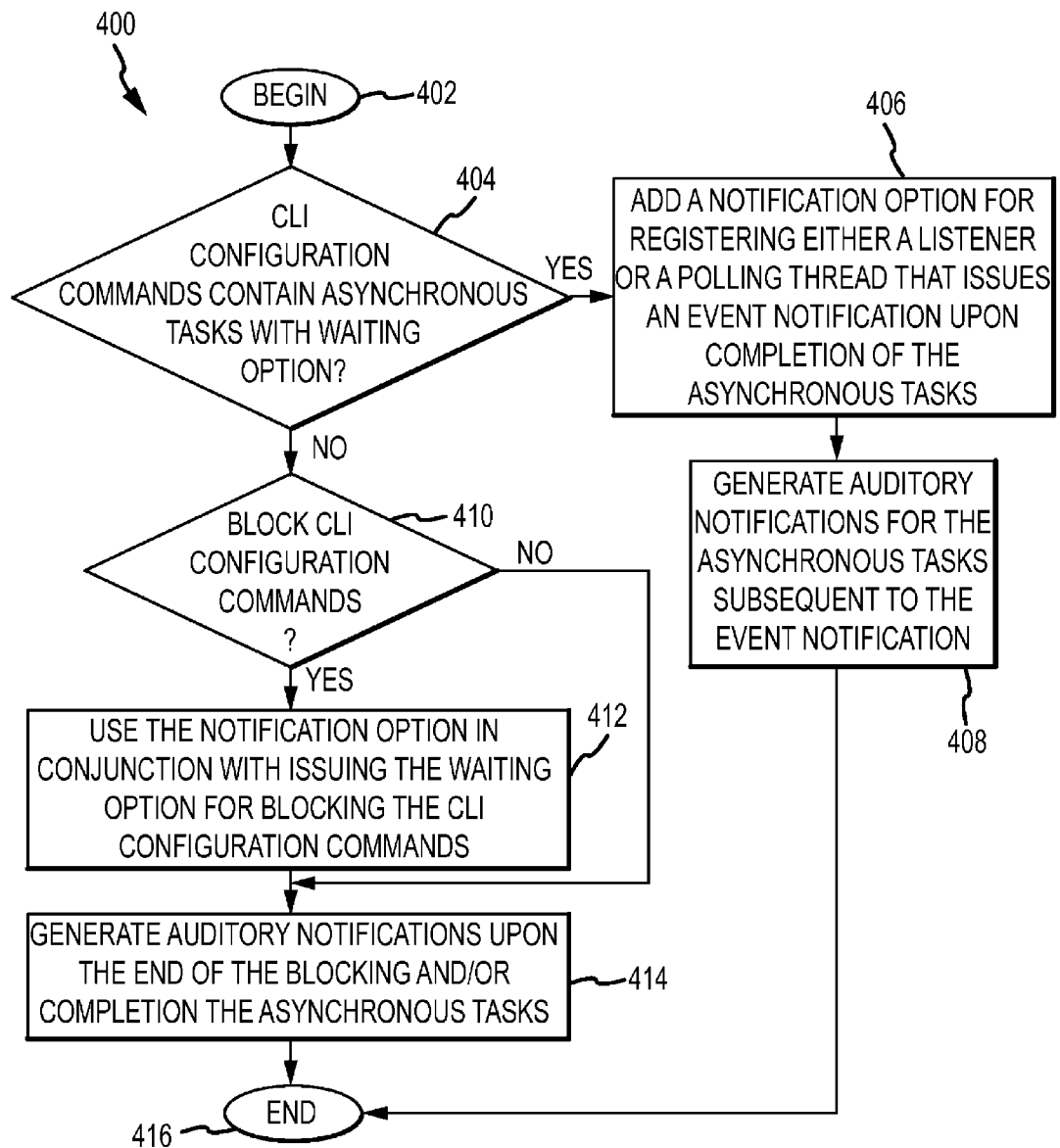
FIG. 4 is a flowchart illustrating an exemplary method for generating audio feedback notifications for asynchronous tasks with waiting options and blocking of CLI commands according to the mechanisms of the illustrated embodiments.

FIG. 4 is a flowchart illustrating an exemplary method 400 for generating audio feedback notifications for asynchronous tasks with waiting options and blocking of CLI commands according to the mechanisms of the illustrated embodiments. The method 400 begins (step 402) with the method 400 determining if a CLI configuration command(s) contain asynchronous tasks with a waiting option (step 404). If yes, the method 400 may add a notification option for registering either a listener or a polling thread that issues an event notification upon completion of the asynchronous tasks (step 406). An auditory notification is generated for the asynchronous tasks subsequent to the event notification (step 408). If no, the method 400 will determine if a need exists to block a CLI configuration command (step 410). The method 400 may use the notification option in conjunction with issuing the waiting option for blocking the CLI configuration commands (step 412). The auditory notifications are generated upon the ending of the blocking and completion the asynchronous tasks (step 414). The method 400 ends (step 416).

As noted previously, in one embodiment, the mechanisms may generate an audible feedback notification option with a waiting option, e.g., a "Notify with Wait." In one embodiment, by way of example only, the audio feedback notification option is not incompatible with the wait option, as previously described. If so desired, the mechanisms allow the user to use the audio feedback notification option when issuing the wait option for a command to both block the CLI configuration command and to be notified via auditory feedback when asynchronous tasks complete and the blocking ends.

Returning now to the CLI configuration commands issuing synchronous and asynchronous tasks, in one embodiment, the CLI configuration commands may issue only a single asynchronous task. If the CLI configuration command initiates a single asynchronous task, a single auditory notification may indicate to a user that the single asynchronous task has completed, without the need of having another window that they are monitoring or requiring a line of text printed to the current window console. Although the mechanisms may refer specifically to storage CLI configuration commands, the mechanisms for the CLI are not meant to be limited only to storage or configuration. Rather, the mechanisms of the present invention may also apply to CLI in other areas such as a CLI for a router and/or to query commands.

As an example of the illustrated embodiments, a common use of the DSCLI is to create virtual capacity space for thin provisioned volumes and then to create thin provisioned volumes within that space. When the user issues the command to configure the virtual capacity on a box, for example, an asynchronous task begins and formats the metadata. The metadata format must complete before a volume may be created. The following command would register an auditory notification for this particular task: "mksestg -dev IBM.2107-75LH321 -notify -vircap 1028 P0."

After executing the CLI configuration commands the user may go on to configure other parts of the storage server. When the DSCLI recognizes the asynchronous metadata format has completed, the mechanisms of the present invention may use an event notification, which matches the existing wait implementation, and notify the user via auditory feedback (e.g., a system "bing" sound) that will indicate to the user it is permissible to return to configuring that particular part of the storage.

In an alternative embodiment, the CLI configuration commands may issue multiple asynchronous tasks. If the CLI configuration commands initiated several asynchronous tasks, there may be separate auditory notifications for indicating that a single task of the CLI configuration commands has completed and a separate auditory notification indicating that all the tasks of the CLI configuration commands are now complete. As an example of the illustrated embodiments, a common use of DSCLI is to setup a synchronous mirror relationship between two storage servers (called a Metro Mirror Relationship). In one embodiment, the following command requests 256 of these relationships to be formed. When the user issues the command, the mechanisms of the illustrated embodiments start one asynchronous process per relationship that attempts to make the target volume simplex (e.g., in sync) with the source volume, by issuing a command such as "mkpprc -dev IBM.2107-75LH321 -remotedev IBM.2107-1300861 -notify -type mmir 0000-00ff:1000-10ff." After executing this command, the mechanisms of the present invention would generate an audio feedback notification and the user would hear one sound (e.g., a system "tick" sound) after each relationship goes to its final state and also a different sound (e.g., a system "bing" sound) when the last relationship goes to complete.

Figure 5:
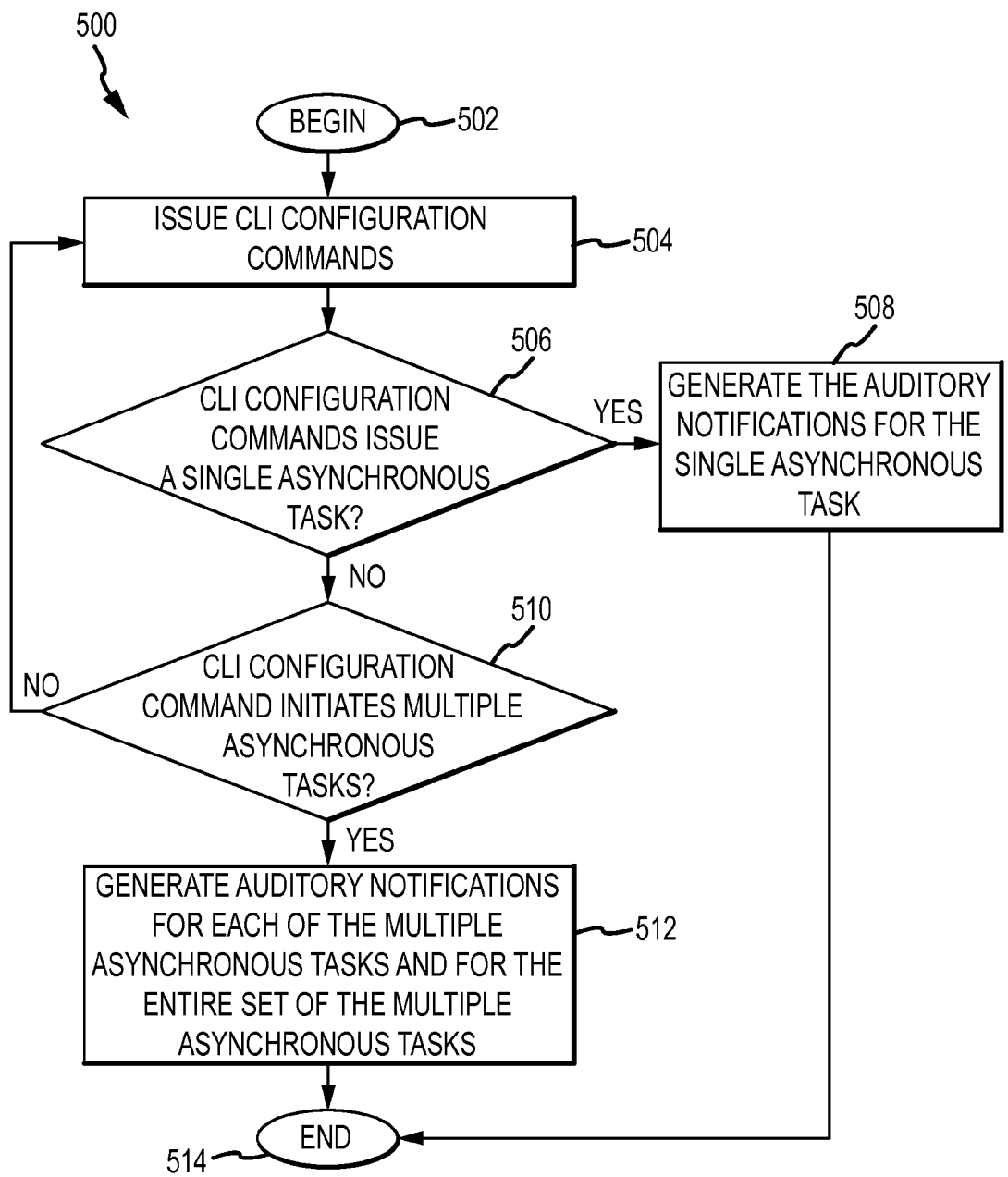
FIG. 5 is a flowchart illustrating an exemplary method for generating audio feedback for asynchronous and synchronous tasks of CLI commands.

Turning to FIG. 5, a flowchart illustrating an exemplary method 500 for generating audio feedback for asynchronous and synchronous tasks of CLI commands according to the mechanisms of the illustrated embodiments. The method 500 begins (step 502) by issuing CLI configuration commands (step 504). The method 500 determines if the CLI command (s) initiate a single asynchronous task (step 506). If yes, the method 500 may generate the auditory notifications upon completion of the single asynchronous task (step 508). A separate auditory notification may be generated upon completion of the CLI configuration command(s). If no, the method 500 will then determine if the CLI configuration commands initiate multiple asynchronous tasks (step 510). If yes, the method 500 may generate the auditory notifications upon completion of each of the multiple asynchronous tasks and upon completion of the entire set of the multiple asynchronous tasks (step 512). If no, the method 500 may repeat end return to step 504. The method 500 ends (step 514).

It should be noted that often times within computing environments, the CLI configuration commands may fail or terminate prematurely for a variety of reasons. In one embodiment, an audio feedback notification may be generated for the CLI configuration commands and/or asynchronous tasks that fail and/or terminate prematurely. If the CLI configuration commands initiated several asynchronous tasks, which may fail, there may be different auditory notification for the variety of failures than the auditory notifications for success. This may be combined with the above idea for commands that result in multiple asynchronous tasks in that the sound for an individual task that is successful in completion may be differentiated from the sound indicating a failure. For example, a very popular use of the DSCLI is to migrate sets of volumes from one extent pool to another extent pool. The following command, for example "managefbvol -action migstart -notify -extpool P2 0000-00ff", requests 256 volumes be migrated from extent pool P0 to extent pool P2. When the mechanisms issue the CLI configuration commands, one asynchronous process per volume is started in an attempt to migrate each volume. After executing the CLI configuration commands, the mechanisms may issue an audio feedback notification enabling a user to hear, for example, one sound (e.g., a system "tick" sound) after each volume completed migration to the target volume, a second sound (e.g., a system "beep" sound) for a volume that failed to migrate to the target pool (due to rank failure, or space being consumed in the target pool while migrations completed), and a third sound (e.g., a system "bing" sound) when the last volume finishes or fails migration. This final sound may also be differentiated depending on whether there was a failure in the list (e.g., a long system "bing" sound, or a double "bing" sound) or no failures in the list (e.g., a short, or normal, system "bing" sound).

In one embodiment, the audio notifications may be produced in the form of sounds by a variety of audio components, and in addition to playing generic audio feedback, the mechanisms of the present invention provide spoken output in a variety of languages the user understands. Thus, not only may the mechanisms provide generic voice messages, such as "action complete", but a text to speech interpreter could also include variables produced by a listener or polling mechanisms that detect the changes in an asynchronous command process being monitored. The vocal output may be configured at a user level to give feedback in any language supported by the text to a speech interpreter it is built on top of for accomplishing the purposes of the present invention. In one embodiment, by way of example only, in order to provide correct output, a command status change summary may be produced by the listener or polling mechanism(s) that detects the change in the command. To do this, the mechanisms may provide a generic look-up table that takes into account the command type, the status change type and any user selected audio output options in order to generate the correct string to be sent to the text to speech interpreter.

FIG. 6 is a flowchart illustrating an exemplary method 600 for generating audio feedback for CLI commands with configurable user preferences. The method 600 begins (step 602) by configuring a look up table for storing user preferences (step 604). The look up table takes into account the type of command, the status change type and any user selected audio output options in order to generate the correct string to be sent for producing the audio notification. The user selects the preferences for the audio notifications for each type of CLI configuration commands and tasks from the look up table (step 606). Having configured the various types of audio notifications, and in conjunction with issuing the CLI configuration commands/tasks, as depicted in FIG. 3-5, the method 600 may determine if any of the CLI configuration commands or tasks have failed (step 608). If yes, the method 600 may generate auditory notification(s) for the failure of any of the CLI configuration commands and/or tasks (step 610). The method 600 may then generate auditory notifications indicating the status of CLI configuration commands (step 612) and generate auditory notifications indicating completion of CLI configuration commands (step 614). The method 600 ends (step 616)

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A system for audio feedback for command line interface (CLI) commands in a computing storage environment, comprising:
    at least one processor device, operable in the computing storage environment, wherein the at least one processor device is adapted for:
    generating at least one of a plurality of auditory notifications for indicating a completion of at least one of a plurality of the CLI commands, the plurality of the CLI commands inclusive of a plurality of synchronous tasks and a plurality of asynchronous tasks, the at least one of the plurality of auditory notifications configurable by a plurality of user preferences;
    wherein for each one of the plurality of the asynchronous tasks of the plurality of the CLI commands having a waiting option, adding a notification option for registering one of a listener and a polling thread that issues an event notification upon completion of each corresponding one of the plurality of asynchronous tasks having a waiting option, further wherein the generating the at least one of the plurality of auditory notifications is performed subsequent to the event notification.

2. The system of claim 1, wherein the generating the at least one of the plurality of auditory notifications includes one of:
    indicating a status of the at least one of the plurality of CLI commands, and
    monitoring the at least one of the plurality of CLI commands without requiring one of a separate window and a line of text printed to a current window.

3. The system of claim 1, wherein the processor device is further adapted for using the notification option in conjunction with issuing the waiting option for blocking the at least one of the plurality of the CLI commands, wherein the generating the at least one of the plurality of auditory notifications is performed upon one of the ending of the blocking or completion of each one of the plurality of asynchronous tasks having a waiting option included in the at least one of the plurality of CLI commands.

4. The system of claim 1, wherein the processor device is further adapted for, upon completion of the at least one of a plurality of CLI commands, performing at least one of:
    if the at least one of the plurality of CLI commands initiates only one of the plurality of asynchronous tasks:
        performing the generating the at least one of the plurality of auditory notifications for the only one of the plurality of asynchronous tasks, and
    if the at least one of the plurality of CLI commands initiates at least two of the plurality of asynchronous tasks:
        performing the generating the at least one of the plurality of auditory notifications for completion of each one of the at least two of the plurality of asynchronous tasks and for completion of the set of the at least two of the plurality of asynchronous tasks.

5. The system of claim 1, wherein the processor device is further adapted for performing the generating the at least one of the plurality of auditory notifications for a failure of the at least one of the plurality of CLI commands.

6. The system of claim 1, wherein the plurality of user preferences includes a plurality of languages for generating voice messages and audible sounds, wherein the user preferences are stored in a look up table to be accessed for configuration of the plurality of auditory notifications.

7. A computer program product for audio feedback for command line interface (CLI) commands by a processor device, the computer program product comprising a non-transitory computer-readable storage medium having computer-readable program code portions stored therein, the computer-readable program code portions comprising:
    a first executable portion for generating at least one of a plurality of auditory notifications for indicating a completion of at least one of a plurality of the CLI commands, the plurality of the CLI commands inclusive of a plurality of synchronous tasks and a plurality of asynchronous tasks, the at least one of the plurality of auditory notifications configurable by a plurality of user preferences;
    wherein for each one of the plurality of the asynchronous tasks of the plurality of the CLI commands having a waiting option, adding a notification option for registering one of a listener and a polling thread that issues an event notification upon completion of each corresponding one of the plurality of asynchronous tasks having a waiting option, further wherein the generating the at least one of the plurality of auditory notifications is performed subsequent to the event notification.

8. The computer program product of claim 7, wherein the generating the at least one of the plurality of auditory notifications includes a second executable portion for performing one of:
    indicating a status of the at least one of the plurality of CLI commands, and
    monitoring the at least one of the plurality of CLI commands without requiring one of a separate window and a line of text printed to a current window.

9. The computer program product of claim 7, further including a second executable portion for using the notification option in conjunction with issuing the waiting option for blocking the at least one of the plurality of the CLI commands, wherein the generating the at least one of the plurality of auditory notifications is performed upon one of the ending of the blocking or completion of each one of the plurality of asynchronous tasks having a waiting option included in the at least one of the plurality of CLI commands.

10. The computer program product of claim 7, further including a second executable portion for, upon completion of the at least one of a plurality of CLI commands, performing at least one of:
    if the at least one of the plurality of CLI commands initiates only one of the plurality of asynchronous tasks:
        performing the generating the at least one of the plurality of auditory notifications for the only one of the plurality of asynchronous tasks, and
    if the at least one of the plurality of CLI commands initiates at least two of the plurality of asynchronous tasks:
        performing the generating the at least one of the plurality of auditory notifications for completion of each one of the at least two of the plurality of asynchronous tasks and for completion of the set of the at least two of the plurality of asynchronous tasks.

11. The computer program product of claim 7, further including a second executable portion for performing the generating the at least one of the plurality of auditory notifications for a failure of the at least one of the plurality of CLI commands.

12. The computer program product of claim 7, wherein the plurality of user preferences includes a second executable portion for including a plurality of languages for generating voice messages and audible sounds, wherein the user preferences are stored in a look up table to be accessed for configuration of the plurality of auditory notifications.

\* \* \* \* \*